March 9, 1937.   H. A. BERG   2,072,938
DISPENSER
Filed Nov. 26, 1934   2 Sheets-Sheet 1
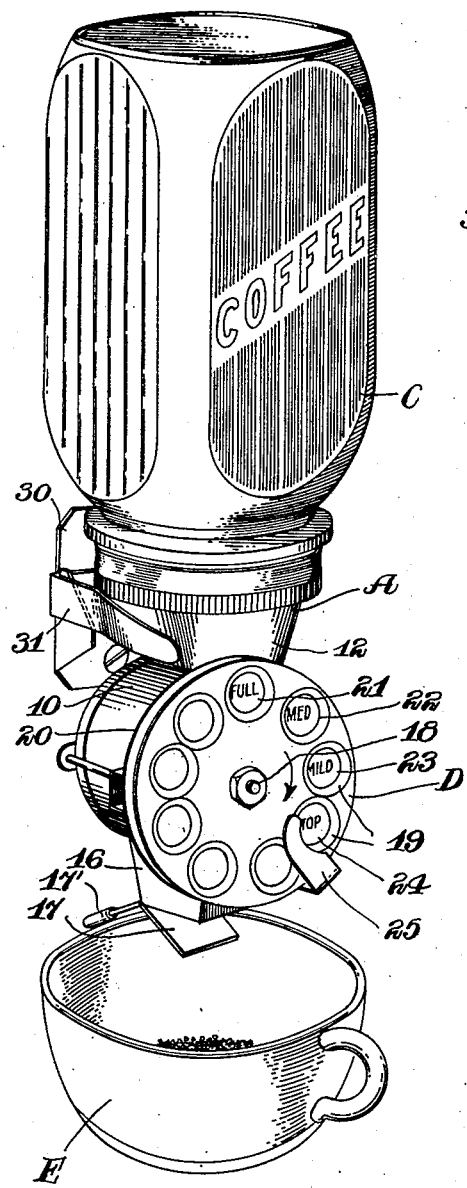
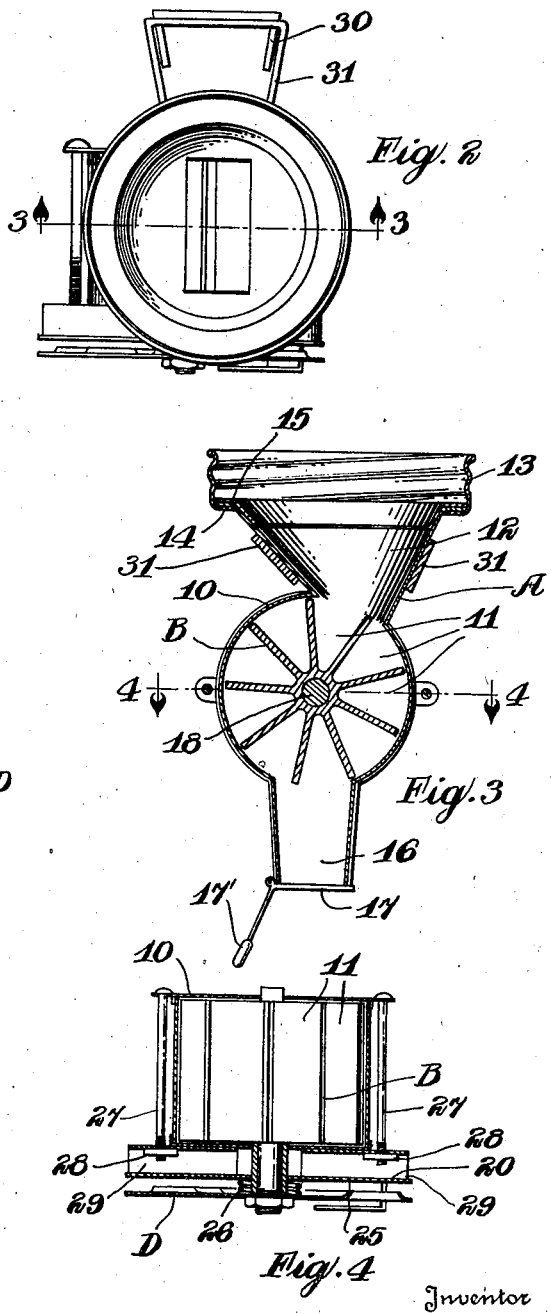
Inventor
Henry A. Berg
By Honald Fricke
Attorney March 9, 1937. H. A. BERG 2,072,938
DISPENSER
Filed Nov. 26, 1934 2 Sheets-Sheet 2
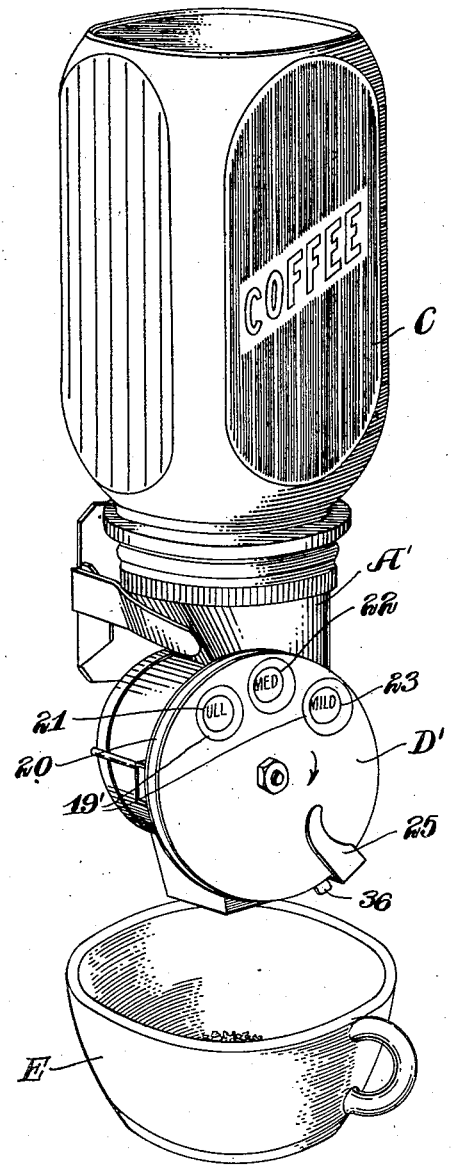
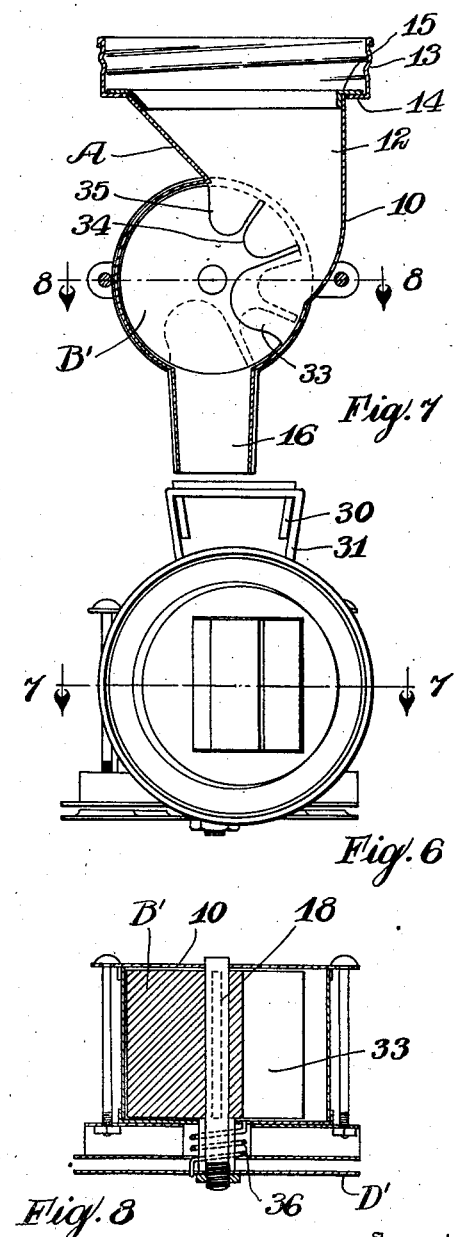
Inventor
Henry A. Berg
By Howard Fischer
Attorney Patented Mar. 9, 1937

2,072,938

UNITED STATES PATENT OFFICE 2,072,938

DISPENSER

Henry A. Berg, Duluth, Minn.

Application November 26, 1934, Serial No. 754,781

14 Claims. (Cl. 221—107)

This is a dispenser particularly adapted to ground coffee or similar edibles or material, where a predetermined amount is desired to be dispensed into a container from the dispensing device. In making coffee it is very desirable to measure out a certain amount of ground coffee for each cup of coffee desired. With my dispenser the coffee may be held in a storage glass jar showing at all times the amount of coffee in the same and the dispensing device, which is connected thereto, is readily operated by the finger to dispense the desired amount of ground coffee for each cup of liquid coffee desired. This includes a finger dial operated dispensing means which measures out readily and accurately the ground coffee.

A feature resides in a dispenser which may be readily attached to the threaded neck of a standard glass jar. The dispensing device includes a casing which is provided with a hanger bracket adapted to engage a wall bracket so as to removably attach the dispenser with the jar container to the wall.

A further feature resides in providing a rotor which is connected by a chute leading from the storage jar so that the ground coffee will enter pockets formed in the rotor. The rotor is connected to the finger operated dial while the dial is provided with the finger openings and is positioned in front of a display dial. Indicia are adapted to be indicated on the display dial which appears through the finger openings in the operating dial so that the operator may select the strength of coffee per cup desired. A discharge chute leads from the lower end of the rotor casing and this may be closed by a suitable hinged closure.

In one form of my dispenser the rotor is adapted to be operated in one direction by a spring, while the finger dial operates the rotor in the other direction. In this form the rotor has different size pockets formed therein so as to provide the desired amount of ground coffee for a mild, medium, and full strength cup of coffee.

An advantage of my dispenser is that the operator may quickly dispense the desired amount of ground coffee for one or more cups of mild, medium or full strength coffee by simply placing the finger in the point where the indicia indicates through the finger opening the desired amount. Thus the ground coffee may be more easily dispensed and a convenient storage is provided for the same.

The dispenser may be attached by a swivelled, threaded collar which permits the dispenser to be adjustably secured to the various types of threaded jars.

The foregoing objects define some of the features of my dispenser, and others will be more fully hereinafter set forth.

In the drawings forming part of the specification:

Figure 1 illustrates a perspective view of my dispenser as it would appear in use.

Figure 2 is a plan view looking down on the dispenser with the storage jar removed.

Figure 3 is a section on the line 3—3 of Figure 2.

Figure 4 is a section on the line 4—4 of Figure 3.

Figure 5 illustrates another form of my dispenser.

Figure 6 is a plan view with the glass storage jar removed.

Figure 7 is a section on the line 7—7 of Figure 6.

Figure 8 is a section on the line 8—8 of Figure 7.

The dispenser A is provided with a housing 10 which is adapted to inclose the rotor B within the same. This rotor is formed with a series of pockets or recesses 11 into which the ground coffee enters through the chute portion 12 which leads from the glass jar or other suitable receptacle C which is adapted to hold a supply of ground coffee or similar material which is to be dispensed by the dispenser A.

The dispenser A is removably and adjustably secured to the jar C by the threaded coupling collar 13 which engages the threads on the neck of the jar C. The coupling collar 13 is freely connected by the flange 14 which bears against the flange 15 on the upper end of the chute 12 to provide a coupling which permits the collar 13 to be rotated to attach it to the threads of the neck of the jar C while the casing 10 of the dispenser A is held stationary and in a fixed or adjusted position.

A discharge or dispensing chute 16 is formed as a portion of the casing 10 out of which the ground coffee is dispensed. This chute may be closed when desired by the hinged closure 17 as illustrated in Figures 1 and 3, with counterbalancing arm 17'.

The rotor B is adapted to be operated by the finger dial D which is attached to the shafts 18 upon which the rotor is mounted. The dial D is formed with finger receiving openings 19. The indicia dial 20 is mounted on the front of the casing 10 directly back of the finger dial and is adapted to display suitable indicia 21, 22, 23, and 24 through the coinciding finger receiving openings 19. The indicia 21 indicates "full", meaning a full strength cup of coffee, the indicia 22 indicates "med", meaning a medium strength cup of coffee, and the indicia 23 indicates "mild", meaning a mild strength cup of coffee. The indicia "stop" indicates the stopping point of the finger in the operation of the dial D. A suitable finger stop member 25 is positioned adjacent the indicia "stop" so as to limit the rotation of the finger in the operation of the dial D.

A suitable spring 26 is interposed between the dial D and the indicia dial 20 to retard the free rotation of the dial D and the rotor B. However, when the dispenser is in use, the ground coffee in the compartments 11 and in the chute 12 have a tendency to retard the rotation of the same and only a slight spring tension is required by the spring 26.

The casing 10 may be taken apart by loosening the bolts 27 which engage the nuts 28 in the channel portions 29 if it is desired. The dispenser A is adapted to be supported on the wall bracket 30 which is removably engaged by the yoke bracket 31 formed on the housing 10. Thus the dispenser A with the jar C may be lifted to disengage the yoke 31 from the wall bracket 30 when it is desired to remove the dispenser A from its operating position, and vice versa when the dispenser is set in position to be used. It will be apparent that with my dispenser A, ground coffee may be discharged into a cup or other suitable receptacle E. It is a material advantage that my dispenser A is provided with an attaching means such as the threaded collar 13 which provides a swivel connection so that the dispenser may be attached to any standard jar which has a threaded neck, thereby increasing the utility of the dispenser in using it as a dispensing means for coffee or other similar edible materials where a predetermined amount of material is desired to be dispensed out into a container.

My dispenser may be made in the form A' illustrated in Figures 5 to 8, inclusive, wherein the casing 10 is provided with the chute 12 to which the swivelled threaded collar 13 is attached by the flanges 14 and 15, respectively. In the dispenser A' the rotor B' is provided preferably with three pockets 33, 34 and 35. The pocket 33 is the lowermost pocket as illustrated in Figure 7 and is larger than the pockets 34 and 35. The purpose of this is that the pocket 33 represents the amount of ground coffee for a mild cup of coffee, whereas, the pockets 34 and 35 represent the amount of additional ground coffee that would be necessary to add to the amount of ground coffee in the pocket 33 to make either a medium cup of coffee if the amount of ground coffee from the pocket 34 were added to the pocket 33 in dispensing the same out of the chute 16, or if a full strength cup of coffee were desired, then both the contents of the pockets 34 and 35 would be added to the contents of the pocket 33 in the dispensing operation in the rotation of the rotor B'.

The rotor B' is supported in the casing on the shaft 18 and is adapted to be brought back each time to the normal position illustrated in full lines in Figure 7 by the spring 36 which contracts against the clockwise movement of the dispensing dial D' to bring the dial back to the normal position as illustrated in Figure 5, and to also cause the shaft 18 to be rotated so as to bring the rotor B' back into the normal position illustrated in full lines in Figure 7.

In this form of the dispenser A', the dispensing dial D' is provided with three or more openings as may be desired, into which the finger may be placed to operate the dispensing dial D'. Through these openings normally will appear the indicia 21 "full", 22 "med", and 23 "mild". Thus with my dispenser A' the operator may select either a "mild", "medium", or "full" strength cup of coffee by simply placing the finger in the respective finger openings 19' of the dial D', and then rotating the dial D' in the direction of the arrow or clockwise until the finger strikes the stop 25. If the operator wishes to make four cups of mild coffee, she simply places her finger in the opening 19' where the indicia indicates "mild" and rotates the dial D' down to the stop 25 and back to the indicia "mild" four times, or in other words, the dial D' is operated from the starting point of either "mild", "medium", or "full", to the stop 25, once for each cup of coffee. A suitable stop 36 projecting from the surface of the dial D' limits the backward movement of the dial by engaging against the stop 25.

It will therefore be apparent that the dispenser A or A' may be operated to dispense a full strength cup of coffee by placing the finger in the opening 19 or 19' of the dials D and D', respectively, and then operating the dial to the stop 25 the number of times that is represented by the number of cups of coffee desired. The dial D in the dispenser A can be continued to be rotated in the same direction as indicated by the arrow in Figure 1, owing to the larger number of finger openings 19 therein, these openings always stopping at a point to display the indicia through the openings 19, whereas, in the dispenser A' each time the dial D' is operated by the finger it should be released to permit it to go back to the normal or starting position before it is rotated down to the stop 25 by the finger.

It is apparent that the desired number of pockets may be formed in the rotor B' and that they may vary in size as may be desired so as to dispense the amount of coffee or cereal that may be desired from the container C. My dispenser provides a handy means of dispensing edibles or other material where it is desired to dispense a predetermined amount of the same. It is convenient, easy and quick to operate, and while the forms shown are particularly adaptable to the dispensing of coffee, it is apparent that the construction may be varied within the scope of the claims without departing from the spirit of the invention. In an article of this character it is essential that it be made simple, inexpensive and practical for use. It may also be used as a sales stimulant where it is desired to dispense powdered or malted milk, or seltzers, or it may even be used in the dispensing of well known breakfast foods, the size being made accordingly, and the character simple and of a practical nature where it is only necessary to operate a finger dial which dispenses the desired amount. The storage container when made of glass such as C, indicates at all times the amount remaining to be dispensed.

A feature resides in mounting the rotor in the casing 10 in a manner so that the casing extends with a wall 10' to a point just beyond the center of the axis of the rotor to direct the material from the jar C through the chute 12 to one side of the axis of the rotor B or B'. This is particularly important in the construction of the rotor B shown in Figure 3. This construction permits the rotor to be more freely operated to prevent the weight of the material in the jar C from retarding the operation of the rotor, thereby permitting the finger dial D to be more easily operated. It will therefore be apparent that the weight of the material in the jar C in operating the rotor B, assists in the operation of the rotor rather than retarding it.

The door 17 which closes the chute 16 in the construction of the casing in Figures 1 to 4, inclusive, is counter-balanced by the weight arm 17' so that it will close automatically when the receptacle is removed from beneath the chute 16. The door 17 is easily opened by the edge of the receptacle E coming in contact with the arm 17', to raise the weighted arm sufficiently to open the door 17 to permit the material to slide freely out of the chute into the receptacle E.

In the construction of the rotor B', the spring 36 is strong enough to return the rotor to normal position, as illustrated in Figure 7 in full lines, and the fact that part of the body of the rotor B' is solid without openings such as 33, 34, 35, and that this part closes off the chute 12 when the rotor B' is moved into discharging position, overcomes the retarding action by the weight of the material in the chute 12 coming down from the receptacle C, permitting the rotor B' to return freely by the spring 36.

The offset position of the rotor in relation to the discharge of the material from the jar C provides an advantage in the operation of the rotor which is of primary importance. Thus I provide a dispenser having its own peculiarities of construction which will readily operate by the finger dial and which does not require a long or powerful operating crank to dispense the material from the storage compartment. It is also apparent that the dispenser may be made in various sizes to accommodate the different materials to be dispensed therefrom and this will be apparent when it is used for different kinds of breakfast foods or other suitable material, such as possibly baking powder and other materials where only a small quantity is required for each compartment of the rotor.

I claim:

1. A dispenser for coffee and the like, including, a casing, means for attaching said dispenser to a supply container of coffee, a spout formed in said casing leading from said container, a measuring rotor having a series of recesses into which the coffee is adapted to slide from the source of supply through said spout, and a finger operated dial having a series of finger receiving openings therein each of which is engageable by the finger and rotated to measure the desired amount of coffee into a container below said dispenser, and a fixed stop adjacent said dial registrable with, and engageable with a finger extending through, any of said openings to stop said dial in any desired position.

2. The combination of, a supply jar for ground coffee, a coupling collar having threads for connecting with the threads formed on the neck of said jar, a housing swivelly connected by said coupling, a rotor in said housing, measuring pockets formed in said rotor, a finger operated dial having finger openings for rotating said rotor into position to dispense the desired amount of coffee from said jar and a fixed stop adjacent said dial registrable with, and engageable with a finger extending through, any of said openings to stop said dial in any desired position.

3. A coffee and the like dispenser, including, means for attaching the dispenser to a container, a measuring rotor having a series of measuring pockets therein, a dial for operating said measuring rotor, finger openings formed in said dial, indicia associated with said finger openings to indicate the amount of coffee to be dispensed, and a stop for limiting the rotation of said dial against which the finger is adapted to engage in the rotation of said finger dial.

4. A dispenser for material adapted to be stored in a container which it is desired to measure out, a finger operated dial having a series of finger receiving recesses, a stationary dial back of said finger operated dial, indicia on said stationary dial adapted to appear through the finger openings in said dial, a finger engaging stop adapted to limit the rotation of said dial, an adjustable connection with a storage receptacle, a dispensing spout, a rotor positioned intermediate said adjustable connection and said dispensing spout, said rotor being adapted to be operated by said finger dial, and recesses in said rotor for receiving a predetermined amount of coffee or the like, said recesses corresponding with said finger openings in said finger dial to measure the desired amount of coffee by the rotation of said dial.

5. A coffee dispenser including, a glass container, threads on the neck of said container, a threaded rotatable collar for engaging the threads on said container, a housing forming a spout adapted to be connected by said threaded collar to said container, a wall bracket for supporting said dispenser to the wall with a removable connection, a rotor in said housing, a spout leading from the bottom of said rotor, recesses in said rotor for receiving coffee and the like, and a finger operated dial having finger openings therein, a stop adjacent said dial registrable with any of said openings, and engageable with a finger extending through any of said openings, to stop said dial in any one of a number of registering positions, each finger opening in said dial indicating the dispensing of one of the recesses in said rotor to regulate the dispensing of the coffee from the container by the finger openings in the rotation of said finger operated dial.

6. A coffee dispenser including, a jar for holding a supply of ground coffee, a dispensing rotor having a series of dispensing pockets formed therein, means for connecting said rotor with said jar, and means for operating said rotor by a finger engaging dial having finger openings which normally display indicia to indicate the proportionate amount of coffee which the rotor will dispense by engaging in the respective finger openings and operating said rotor to a predetermined stopping point, and a fixed stop adjacent said dial registrable with any of said openings and engageable with a finger through any of said openings to stop said dial in any one of a number of registering positions.

7. A dispenser including, a container for a supply of material, a selector having varying sized selecting pockets for selecting the desired amount of material from said container, and means for manually operating said selector from a receiving position in which position said pockets communicate with said container supply to a dispensing position, said means selecting the movement of the selector to the desired dispensing position and means operable when said manually operating means is released for automatically moving said selector back from dispensing position to receiving position.

8. The combination of, a container for storing material which is to be dispensed, a movable material selector operable from receiving position to dispensing position having receiving pockets therein, spring means for moving said selector into, and normally holding said selector in, receiving position wherein said selector is connected with said storage container successively filling all of said pockets, and finger engaging means for moving the selector into the desired selected dispensing positions.

9. The combination of, a storage container for material to be dispensed, a dispensing selector having a series of dispensing pockets formed therein, means for normally holding said selector in position to fill said pockets automatically from said storage container, manually operable means for moving said selector into various selected positions to dispense the desired amount of material from said storage container and means operable when said manually operable means is released for automatically moving said selector from dispensing position back to receiving position.

10. The combination of, a selector dispenser to select and dispense various amounts of material such as ground coffee, a storage container connected in a manner to feed the ground coffee simultaneously to all of said pockets of said selector, indicia adapted to indicate the amount of ground coffee to be dispensed by said selector, and finger engageable operating means for said selector whereby the operating finger may engage the finger operating means at the desired indicia to dispense the desired amount of coffee by operating said selector to the desired position from normal position.

11. A dispenser for edible materials comprising, a casing, means for attaching said casing to a receptacle which forms a source of supply, a dispensing rotor in said casing movable into two extreme positions, a passageway leading to said rotor from the receptacle which forms the source of supply, said passageway being offset in relation to the axis of said rotor to direct the material to the rotor to one side of the axis, means holding said rotor normally in one extreme position, said rotor including a plurality of divisions each of which is in normal communication with said passageway when said rotor is in said one extreme position, for receiving predetermined amounts of material to be dispensed, and means for selectively rotating said rotor into various dispensing positions.

12. A dispenser for dry materials of a granular nature including, a casing, a rotor mounted offset in said casing, recesses formed in said rotor for materials to be dispensed, means for operating said rotor, a chute leading from the discharge side of said rotor, and an automatic closure operable by the weight of the materials dropped thereon and having a counter-weighted arm for closing said closure to permit material to be discharged out of said chute when the same is opened.

13. In a dispensing device, a container, a hopper bottom therefor having an opening therein, a revoluble member positioned in said bottom and having a plurality of pockets adapted to discharge through said opening, a dial on said revoluble member positioned in close proximity to said container, said dial having abutments corresponding in number to said pockets and a stop on said device adapted to register with any of said abutments, said stop being positioned so as to register with said abutments when the pockets corresponding thereto are opposite said opening.

14. A dispenser including a container having a discharge passage, a measuring rotor in said discharge passage having a series of measuring pockets therein, a dial for operating said measuring rotor, finger openings in said dial, indicia associated with said finger openings to indicate the amount of material to be dispensed, and a stop adjacent said dial and registrable with said openings for limiting the rotation of said dial against which the finger is adapted to engage in the rotation of said finger dial to stop said dial in one of a number of positions.

HENRY A. BERG.